(12) United States Patent
Yasuda

(10) Patent No.: US 7,941,045 B2
(45) Date of Patent: May 10, 2011

(54) CAMERA BODY, INTERCHANGEABLE LENS UNIT, AND IMAGING APPARATUS

(75) Inventor: Koji Yasuda, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/607,465

(22) Filed: Oct. 28, 2009

(65) Prior Publication Data

US 2010/0111517 A1   May 6, 2010

(30) Foreign Application Priority Data

Oct. 30, 2008 (JP) ................. 2008-279883

(51) Int. Cl.
*G03B 17/00* (2006.01)
(52) U.S. Cl. ........................................ 396/532
(58) Field of Classification Search ........... 396/529–533
See application file for complete search history.

(56) References Cited

U.S. PATENT DOCUMENTS

| | | | | |
|---|---|---|---|---|
| 4,653,889 A | * | 3/1987 | Haneishi | 396/532 |
| 4,939,532 A | * | 7/1990 | Takebayashi | 396/532 |
| 4,999,659 A | * | 3/1991 | Fukahori et al. | 396/532 |
| 5,021,812 A | | 6/1991 | Kohno et al. | |
| 5,177,520 A | * | 1/1993 | Kohno et al. | 396/129 |

FOREIGN PATENT DOCUMENTS

| | | |
|---|---|---|
| EP | 0363968 | 10/1989 |
| JP | 58-75139 A | 5/1983 |
| JP | 58-223134 A | 12/1983 |
| JP | 62-27338 | 2/1987 |
| JP | 2-103522 A | 4/1990 |
| JP | 9-90489 A | 4/1997 |

* cited by examiner

*Primary Examiner* — W. B. Perkey
*Assistant Examiner* — Dennis Hancock
(74) *Attorney, Agent, or Firm* — Panasonic Patent Center; Dhiren Odedra; Kerry Culpepper

(57) ABSTRACT

A camera body that includes a lens attaching unit to which an interchangeable lens unit including a lens-side contact is mountable and that communicates information with the interchangeable lens unit when the interchangeable lens unit is attached to the lens attaching unit, the camera body comprising: a substrate; a holding member fixed to the substrate and formed of a conductive material; a body-side contact that is electrically connected to the lens-side contact when the interchangeable lens unit is mounted to the camera body and that is held by the holding member so as to be movable between a projected position at which the body-side contact projects from the holding member and a retracted position; and a biasing unit that biases the body-side contact to the projected position, wherein the body-side contact is electrically connected to the holding member.

9 Claims, 13 Drawing Sheets

CAMERA BODY, INTERCHANGEABLE LENS UNIT, AND IMAGING APPARATUS

BACKGROUND

1. Field of the Invention

The technical field relates to a camera body to which an interchangeable lens unit is mountable, and also relates to an interchangeable lens unit which is mountable to a camera body. Moreover, the technical field relates to an imaging apparatus including a camera body and an interchangeable lens unit which are detachable from each other.

2. Related Art

A single-lens reflex type digital camera generally includes a camera body having an imaging device and the like, and an interchangeable lens unit including lenses and the like. The camera body has a lens mount to which the interchangeable lens unit can be mounted therefrom. In such a digital camera, both the camera body and the interchangeable lens unit have electric contacts so that various information can be communicated between the camera body and the interchangeable lens unit when the interchangeable lens unit is attached to the lens mount of the camera body. Such a configuration is disclosed in, for example, JP-U-A-62-27338.

Electric contacts disclosed in JP-U-A-62-27338 are arranged in a lens mount of a camera body. Each electric contact is arranged so as to be displaceable between a projected position in which the electric contact projects from a surface of the lens mount and a retracted position in which the electric contact is retracted in the lens mount, and is biased to the projected position by a spring. Thus, when an interchangeable lens unit is not attached to the lens mount, the electric contact is in the projected position. When the interchangeable lens unit is attached to the lens mount, the electric contact is pressed by a terminal arranged on the interchangeable lens unit and is thereby displaced to the retracted position. At this time, since the electric contact is being electrically in contact with the terminal, the camera body and the interchangeable lens unit can be electrically connected to each other.

However, in the configuration disclosed in JP-U-A-62-27338, since a lead wire is soldered at a lower end of an electric contact, when the electric contact is repeatedly displaced between the projected position and the retracted position along with the operations of detaching the interchangeable lens unit, a load is applied to a portion where the electric contact and the lead wire are soldered, which highly likely causes a break in the lead wire.

In addition, since the electric contact and an electrical circuit board in the camera body are electrically connected to each other by the lead wire, there is limited flexibility in the layout of electric contacts due to the routing of lead wires, and the like.

An object of the present embodiment is therefore to provide a camera body, an interchangeable lens unit, and an imaging apparatus that can prevent a wire from being broken at a soldered portion even when an electric contact is repeatedly displaced along with the operations of attaching and detaching the interchangeable lens unit and that can improve flexibility in the layout of electric contacts.

SUMMARY

In a first aspect, a camera body is provided. A camera body includes a lens attaching unit to which an interchangeable lens unit including a lens-side contact is mountable and communicates information with the interchangeable lens unit when the interchangeable lens unit is attached to the lens attaching unit, the camera body including: a substrate; a holding member fixed to the substrate and formed of a conductive material; a body-side contact that is electrically connected to the lens-side contact when the interchangeable lens unit is mounted to the camera body and that is held by the holding member so as to be movable between a projected position at which the body-side contact projects from the holding member and a retracted position; and a biasing unit that biases the body-side contact to the projected position, wherein the body-side contact is electrically connected to the holding member.

In a second aspect, an interchangeable lens unit is provided. An interchangeable lens unit includes a body attaching unit mountable to a camera body including a body-side contact and communicates information with the camera body when the camera body is attached to the body attaching unit, the interchangeable lens unit including: a substrate; a holding member fixed to the substrate and formed of a conductive material; a lens-side contact that is electrically connected to the body-side contact when the interchangeable lens unit is mounted to the camera body and that is held by the holding member so as to be movable between a projected position at which the lens-side contact projects from the holding member and a retracted position; and a biasing unit that biases the lens-side contact to the projected position, wherein the lens-side contact is electrically connected to the holding member.

In a third aspect, an imaging apparatus is provided. An imaging apparatus includes the above-described camera body and the above-described interchangeable lens unit.

According to the above aspects, even when an electric contact is repeatedly displaced, a load is not applied to a soldered portion and thus a wire can be prevented from breaking at the soldered portion. In addition, flexibility in the layout of electric contacts can be improved. Furthermore, the electric contacts can be disposed with narrow pitches. Specifically, in the conventional configuration (JP-A-62-27338), since a lead wire is connected to an electric contact, there is limited flexibility in the layout of electric contacts due to the routing of lead wires and the like. However, in the above aspects, since an electric contact is fixed to a substrate through a holding member formed of a conductive material, a problem associated with the routing of lead wires and the like, does not arise. Accordingly, flexibility in the layout of electric contacts can be improved. In addition, the electric contacts can be disposed with narrow pitches, further enabling miniaturization of the apparatus.

In the above aspects, since a member that abuts on a movable electric contact is configured by a holding member that holds the electric contact, the electric contact comes into surface-contact with the holding member. Thus, the contact area increases more over the case in which an electric contact comes into point contact with a member that abuts on the electric contact and feeds electricity thereto, and accordingly, the electrical resistance can be reduced.

BRIEF DESCRIPTION OF DRAWINGS

FIG. 5C is an exploded perspective view of a shutter unit, an imaging unit, a heat sink, and the like;

DETAIL DESCRIPTION OF PREFERRED EMBODIMENT

A camera body and an interchangeable lens unit in the above aspects can take the following aspects based on the above-described configuration. Specifically, in the camera body and the interchangeable lens unit in the above aspects, the configuration may be such that the biasing unit is formed of a conductive material and is held by the holding member, and the body-side contact is electrically connected to the holding member through the biasing unit. By employing such a configuration, an electric contact and a printed circuit board can be electrically connected to each other through a biasing unit.

In the camera body in the above aspect, the configuration may be such that one end of the biasing unit projects penetrating through the holding member. By employing such a configuration, the material cost required to fabricate the holding member can be reduced.

Embodiment

1. Configuration of an Imaging Apparatus

An imaging apparatus in the above aspect includes a camera body and an interchangeable lens unit.

Figure 1:
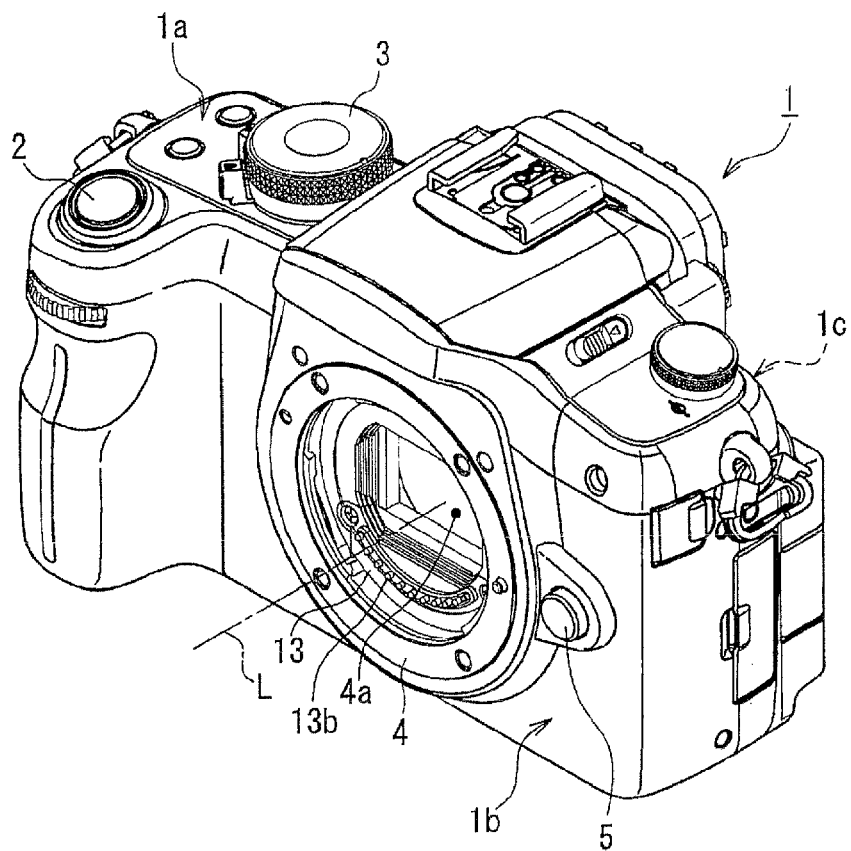
FIG. 1 is a perspective view showing an external appearance of a camera body according to an embodiment.
Figure 2:
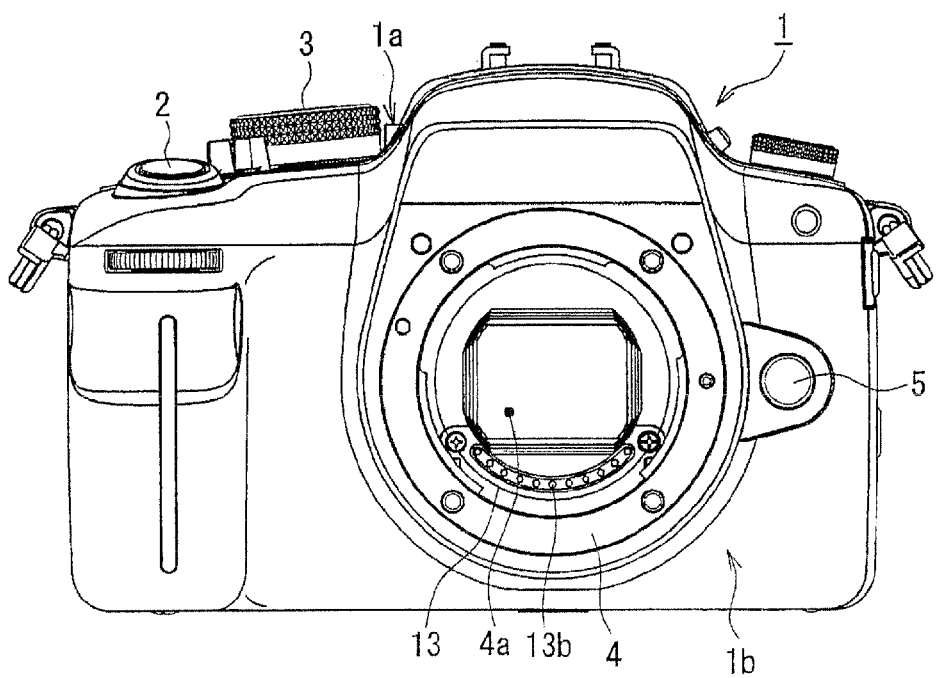
FIG. 2 is a front view showing the external appearance of the camera body according to the embodiment.

FIG. 1 is a perspective view showing an external appearance of a single-lens type camera body according to the present embodiment. FIG. 2 is a front view of the camera body shown in FIG. 1. Note that although in the present embodiment a single-lens type digital camera with no mirror box is described as an example, the configuration of a characteristic portion in the present embodiment can also be applied to a single-lens reflex type digital camera with a mirror box. The camera may be a camera of any type as long as it is at least a lens interchangeable type and information can be communicated between an interchangeable lens unit and a camera body. Thus, not only a digital camera but also a lens interchangeable type silver-halide camera may be used.

As shown in FIGS. 1 and 2, a release button 2, a mode dial 3, and the like are arranged on a top side 1a of a camera body 1. With a press operation on the release button 2, an operation of shooting a subject can be performed. In the case of an imaging apparatus having an auto focus function, with a half-press operation on the release button 2, an operation of moving a focus lens in an optical axis direction to focus a subject can be performed. The mode dial 3 can be rotated. By rotating the dial 3, various shooting modes, and the like, can be selected.

A lens mount 4, an unlock button 5, and the like, are arranged on a front side 1b (a side that is substantially orthogonal to the top side 1a and faces the subject side when shooting a subject) of the camera body 1. The lens mount 4 has a substantially circular opening 4a. An interchangeable lens unit (described later) can be mounted to the lens mount 4. A contact pin unit 13 is arranged on the inner side of the lens mount 4. The contact pin unit 13 includes a plurality of contact pins 13b. In the present embodiment, there are 11 contact pins 13b. The contact pins 13b are electrically connected to an electrical circuit board (not shown) through a flexible printed circuit (hereinafter, referred to as the FPC) included in the camera body 1. Note that a specific configuration of the contact pin unit 13 will be described later. A press of on the unlock button 5 with an interchangeable lens unit being attached to the lens mount 4 releases a fixed state of the interchangeable lens unit to the lens mount 4 so that the interchangeable lens unit can be detached from the lens mount 4.

Figure 3:
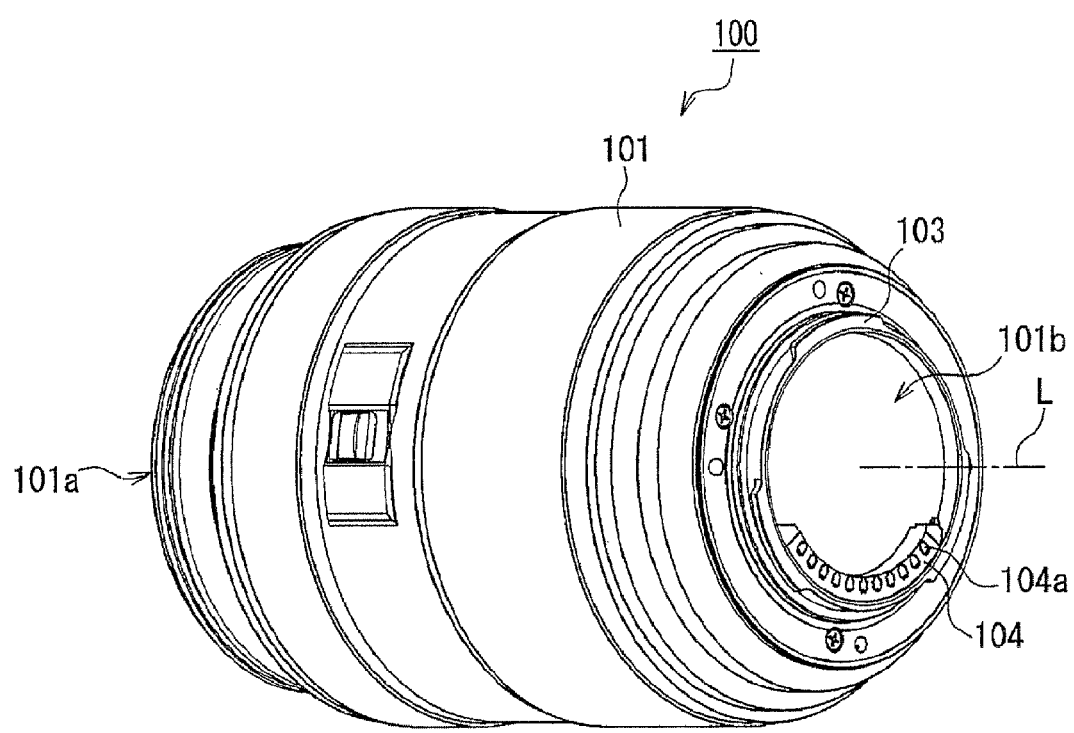
FIG. 3 is a perspective view of an interchangeable lens unit.

FIG. 3 is a perspective view of an interchangeable lens unit. An interchangeable lens unit 100 is mountable to the lens mount 4 of the camera body 1 shown in FIGS. 1 and 2. The interchangeable lens unit 100 includes various lenses such as an objective lens and a zoom lens in a substantially cylindrical lens barrel 101. An objective lens is exposed at one end 101a in an optical axis L direction of the lens barrel 101. Amount 103 which is mountable to the lens mount 4 of the camera body 1 is arranged at an other end 101b of the lens barrel 101. The interchangeable lens unit 100 includes a lens microcomputer. The lens microcomputer has information about specifications thereof, and the like, recorded therein and can control various units (a motor that drives the zoom lens, a motor that drives the focus lens, and the like) included in the interchangeable lens unit 100, based on control signals sent from the camera body 1. A terminal unit 104 is arranged near the mount 103. The terminal unit 104 includes a plurality of contacts 104a which are electrically connected to the lens microcomputer. In the present embodiment, the terminal unit 104 has eleven contacts 104a, the number of which is the same as that of the contact pins 13b.

Figure 4:
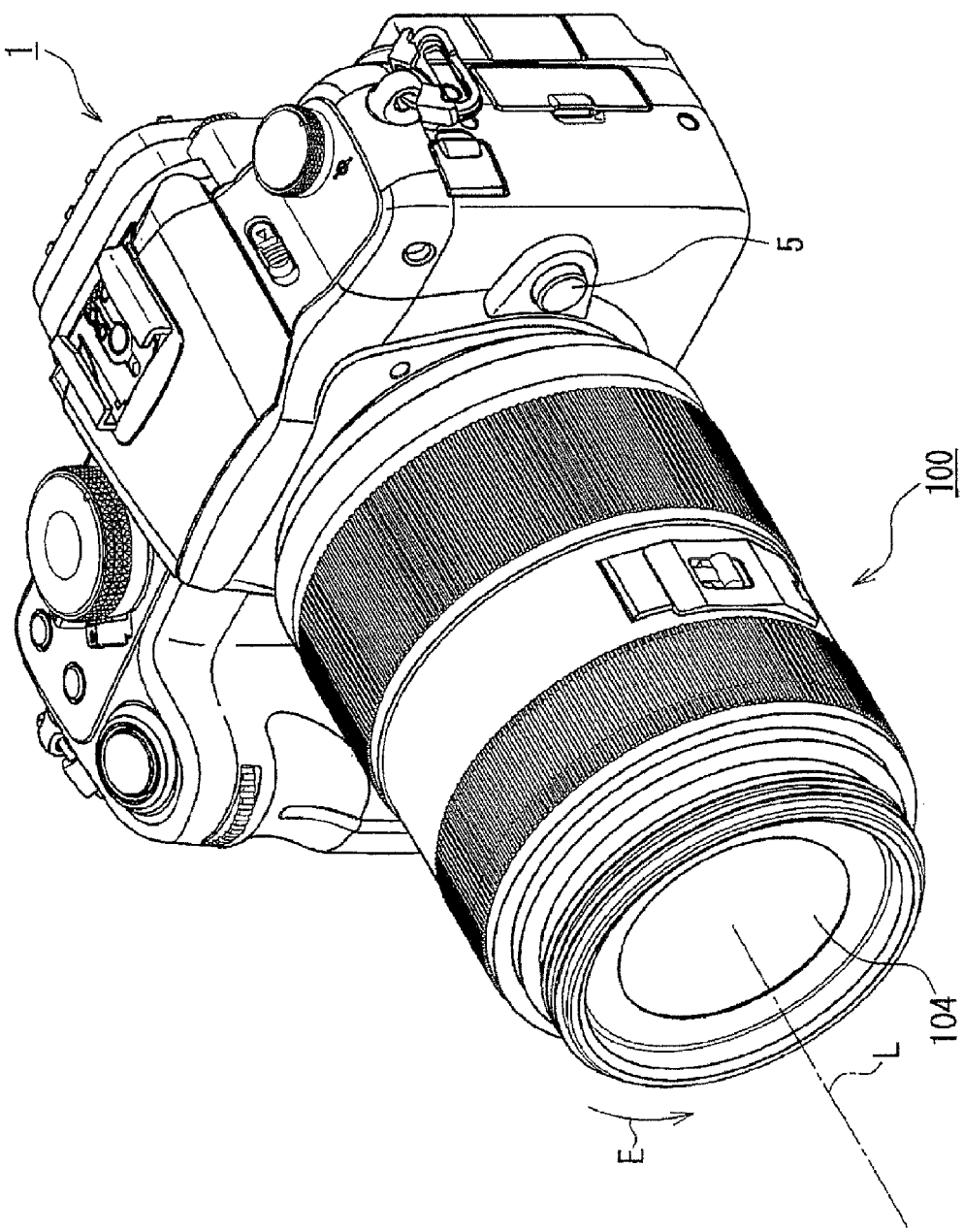
FIG. 4 is a perspective view of an imaging apparatus.

FIG. 4 is a perspective view showing a configuration of the camera body 1 having the interchangeable lens unit 100 attached thereto. As shown in FIG. 4, by attaching the interchangeable lens unit 100 to a normal position of the lens mount 4 of the camera body 1 in a normal attitude, the contacts 104a (see FIG. 3) abut on the contact pins 13b (see FIG. 1), whereby an electrical connection therebetween is established.

In the state shown in FIG. 4, press operation of the unlock button 5 by a user releases a fixed state of the interchangeable lens unit 100 to the lens mount 4 so that the interchangeable lens unit 100 can be detached from the camera body 1. Specifically, in a state in which the interchangeable lens unit 100 is attached to the camera body 1, the lens mount 4 is screwed and fixed to the mount 103. In a state in which the unlock button 5 is not pressed, a pin arranged on the lens mount 4 fits into a hole formed in the mount 103 and thus the interchangeable lens unit 100 cannot rotate in a direction indicated by an arrow E. In this case, by pressing the unlock button 5, the pin is detached from the hole and thus the interchangeable lens unit 100 can rotate in the direction indicated by the arrow E. Then, rotating of the interchangeable lens unit 100 in the direction indicated by the arrow E releases an engaged state of the lens mount 4 with the mount 103 and accordingly the interchangeable lens unit 100 can be detached from the camera body 1. By detaching the interchangeable lens unit 100 from the camera body 1, the contacts 104a and the contact pins 13b are separated from each other and accordingly the electrical connection therebetween is released.

2. Configuration of an Imaging System

The camera body 1 shown in FIGS. 1 and 2 includes an imaging system. The imaging system mainly includes a mount unit, a shutter unit, and an imaging unit. A configuration of the imaging system will be described below.

Figure 5A:
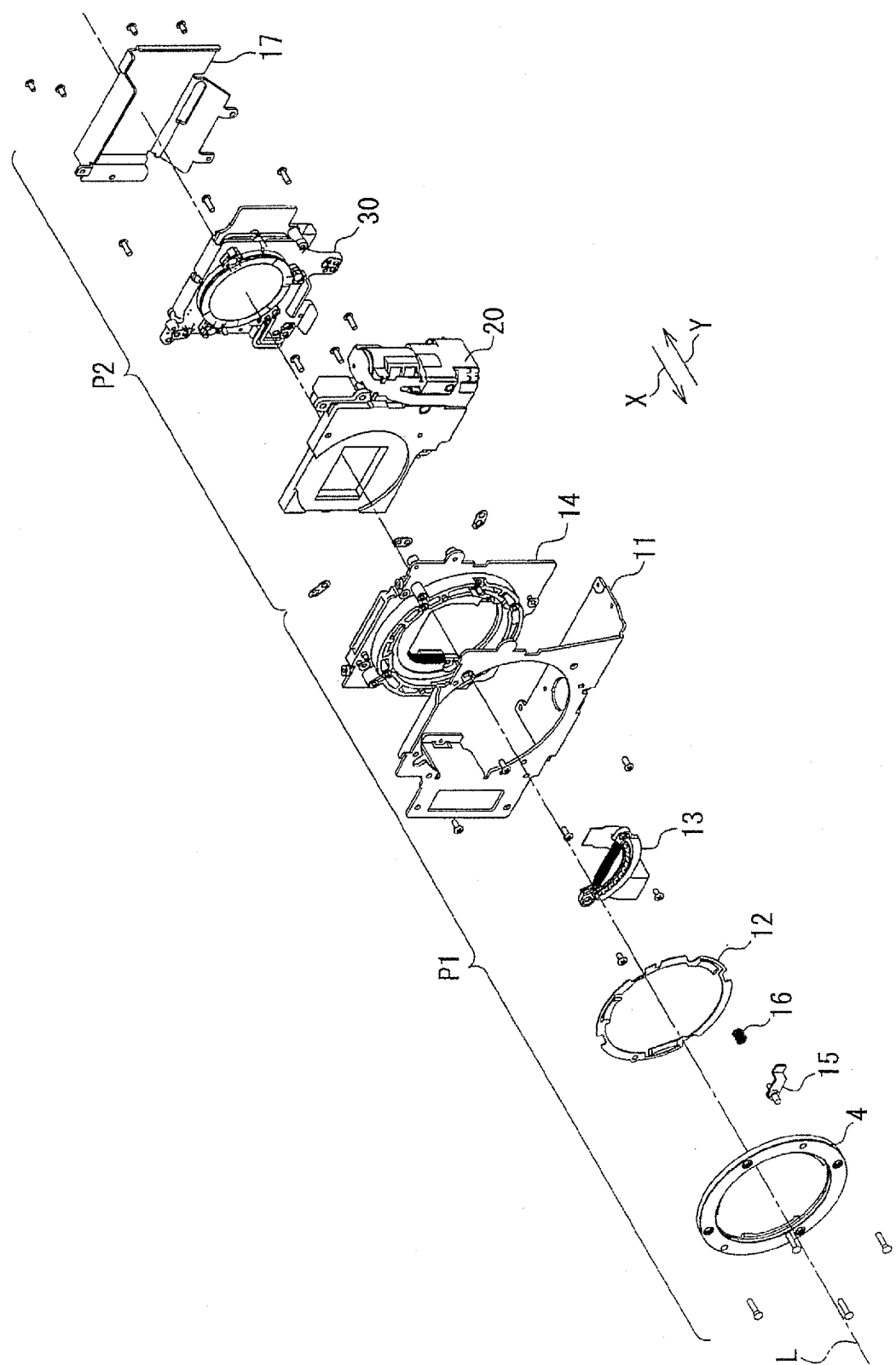
FIG. 5A is an exploded perspective view of an imaging system.
Figure 5B:
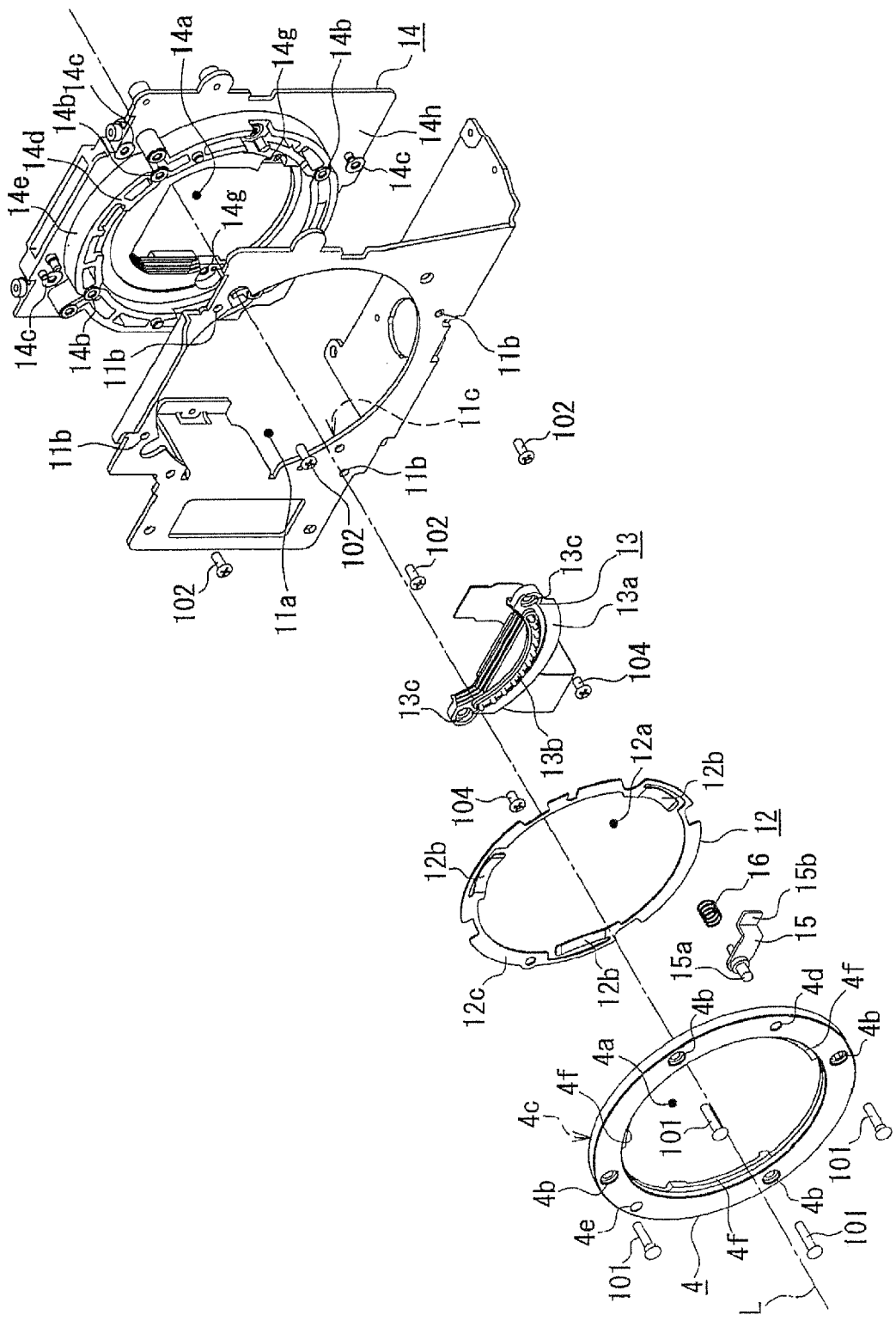
FIG. 5B is an exploded perspective view of a mount unit.
Figure 5C:
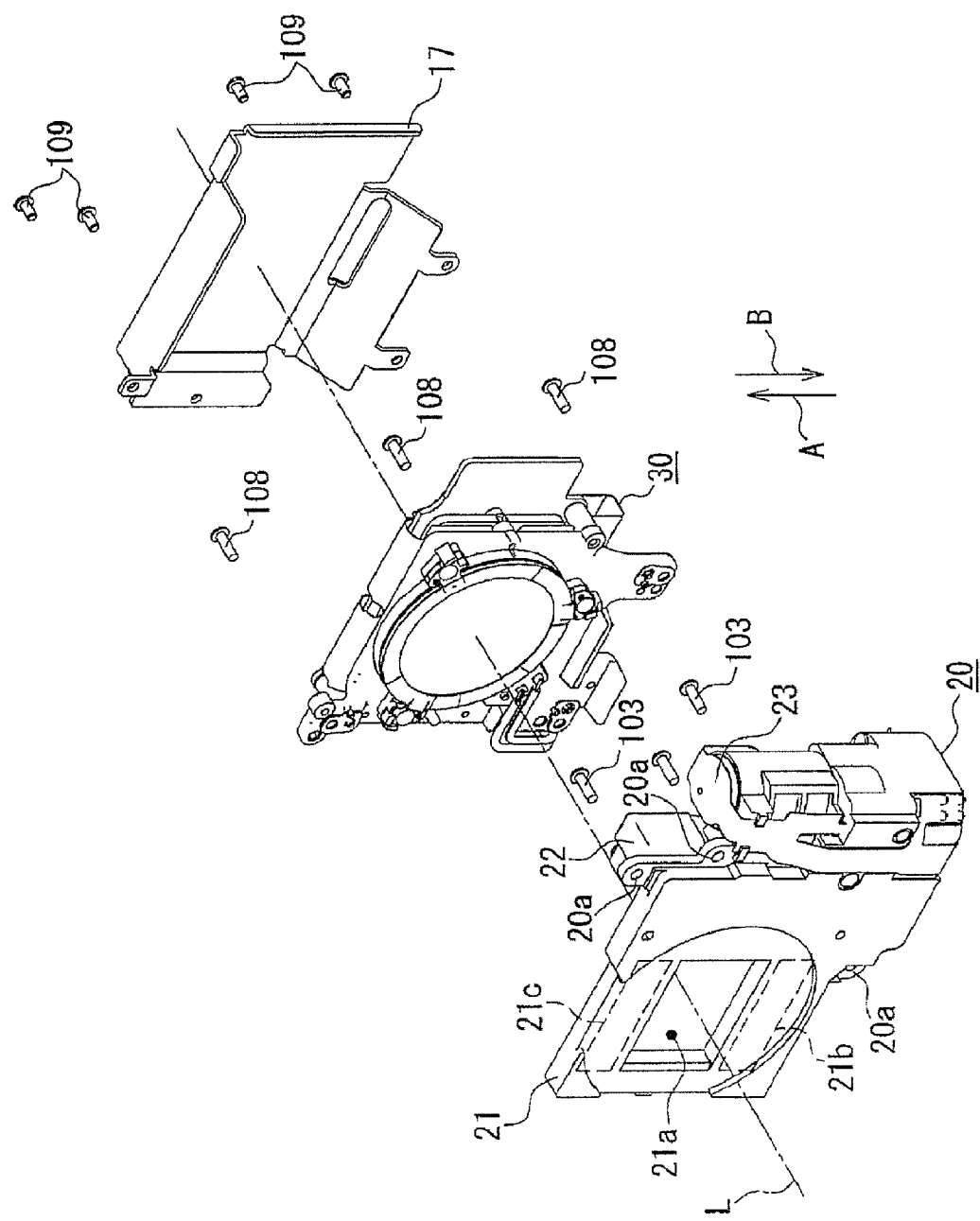

FIG. 5A is an exploded perspective view of the imaging system. FIG. 5B is an enlarged perspective view of a part group P1 in FIG. 5A. FIG. 5C is an enlarged perspective view of a part group P2 in FIG. 5A. The part group P1 is a part group configuring a mount unit. The part group P2 includes a shutter unit 20, an imaging unit 30, and a heat sink 17.

As shown in FIG. 5A, in the imaging system, the lens mount 4, a lens mount spring 12, the contact pin unit 13, a main frame 11, a mount frame 14, the shutter unit 20, the imaging unit 30, and the heat sink 17 are arranged in this order along the optical axis L from the side of the front side 1b (see FIG. 1, and the like) in the optical axis L direction. Such order of arrangement of the parts is an example. Note that, in the description of the present embodiment, for the parts included in the imaging system, a surface facing a direction indicated by an arrow X is defined as the "front surface" and a surface facing a direction indicated by an arrow Y is defined as the "back surface". A configuration of each part will be described below.

As shown in FIG. 5B, the main frame 11 is formed of a metal such as stainless. An opening 11a for guiding light to an imaging sensor is provided substantially in the center of the main frame 11. In the main frame 11, holes 11b which allow a plurality of (four in the present embodiment) screws 102 to be inserted thereinto are formed around the opening 11a.

The lens mount 4 is formed of a metal such as stainless. An opening 4a for guiding light to the imaging sensor is provided substantially in the center of the lens mount 4. In the lens mount 4, a plurality of (four in the present embodiment) holes 4b which allow screws 101 to be inserted thereinto are formed. Moreover, in the lens mount 4, a hole 4d into which a protrusion 15a of a lens lock pin 15 (described later) is inserted and arranged is formed. In the lens mount 4, a mark 4e is formed which is used to align the position of the interchangeable lens unit 100 to the position of the lens mount 4 (a relative position in a direction of rotation about the optical axis L) when the user attaches the lens unit 100 to the camera body 1.

An opening 12a for guiding light to the imaging sensor is provided substantially in the center of the lens mount spring 12. In the lens mount spring 12, a plurality of (three in the present embodiment) springs 12b are formed near an outer edge thereof. The springs 12b are elastically deformable in the optical axis L direction. A front surface 12c of the lens mount spring 12 abuts on a back surface 4c of the lens mount 4. There is a slight gap between the springs 12b and a front surface 14d of the mount frame 14. The springs 12b abut on an engaged portion of the interchangeable lens unit 100 attached to the camera body 1, as being elastically deformed. With this configuration, wobbling between the camera body 1 and the interchangeable lens unit 100 can be reduced.

The contact pin unit 13 includes a resin frame 13a and a plurality of (11 in the present embodiment) contact pins 13b. The contact pins 13b are arranged so as to project from a front surface of the frame 13a to the side of the lens mount 4 in the optical axis L direction. When the interchangeable lens unit 100 is attached to the lens mount 4, the contact pins 13b are electrically connected to the contacts 104a provided to the interchangeable lens unit 100. With this configuration, information can be communicated between a camera microcomputer arranged in the camera body 1 and the lens microcomputer arranged in the interchangeable lens unit 100. In the contact pin unit 13, a plurality of (two in the present embodiment) holes 13c which allow screws 104 to be inserted thereinto are formed.

The mount frame 14 is formed of a resin. An opening 14a for guiding light to the imaging sensor is provided substantially in the center of the mount frame 14. In the mount frame 14, a substantially cylindrical projection 14e is formed around the opening 14a. A plurality of (four in the present embodiment) screw holes 14b which allow the screws 101 to be screwed thereinto are formed in the front surface 14d of the projection 14e. The projection 14e has an outside diameter at which the projection 14e can be inserted into the opening 11a of the main frame 11. In the mount frame 14, a plurality of (four in the present embodiment) screw holes 14c are formed around the projection 14e. Moreover, in the mount frame 14, a plurality of (two in the present embodiment) screw holes 14g are formed near the opening 14a. The screws 104 are screwed into the screw holes 14g.

The lens lock pin 15 has the protrusion 15a formed at one end thereof and has a pressing portion 15b formed at the other end thereof. The protrusion 15a is inserted and arranged in the hole 4d formed in the lens mount 4. When the interchangeable lens unit 100 is attached to the normal position of the lens mount 4, the protrusion 15a can fit into a recess (not shown) formed in the interchangeable lens unit 100. By thus allowing the protrusion 15a to fit into the recess formed in the interchangeable lens unit 100, positioning in a direction of rotation about the optical axis L of the interchangeable lens unit 100 attached to the lens mount 4 can be performed. The pressing portion 15b is arranged in the rear of an unlock button (now shown) arranged on the front side 1b of the camera body 1. A press operation on the front surface side of the unlock button by the user, presses the pressing portion 15b in the direction indicated by the arrow Y in FIG. 5A by the unlock button. In the lens lock pin 15, a lock pin spring 16 is arranged on a back surface side of a surface where the protrusion 15a is arranged. Thus, the lens lock pin 15 is always biased in the direction indicated by the arrow X in FIG. 5A. In this manner, with a press operation on the unlock button, the lens lock pin 15 is displaced in the direction indicated by the arrow Y in FIG. 5A against a biasing force of the lock pin spring 16. When the unlock button is pressed in the direction indicated by the arrow Y in FIG. 5A, the protrusion 15a is detached from the recess formed in the interchangeable lens unit 100, enabling the interchangeable lens unit 100 to rotate about the optical axis L. Accordingly, the interchangeable lens unit 100 can be removed from the lens mount 4.

As shown in FIG. 5C, the shutter unit 20 includes a shutter mechanism 21, a shutter controller 22, and a motor 23. In the shutter mechanism 21, there is provided a substantially rectangular opening 21a for guiding light incident from outside to an imaging sensor (described later) in the imaging unit 30. The shutter mechanism 21 also includes a plate-like first curtain 21b and a plate-like second curtain 21c which can cut off light passing through the opening 21a. Note that, for convenience of description, FIG. 5C shows a state in which the first curtain 21b is contained in a container below the opening 21a and the second curtain 21c is contained in a container above the opening 21a. The first curtain 21b and the second curtain 21c are arranged so as to be displaceable in directions indicated by arrows A and B. The shutter controller 22 includes a plunger mechanism and thus can hold the first curtain 21b and the second curtain 21c in a retracted state (a state in which, as shown in FIG. 5C, the first curtain 21b and the second curtain 21c are retracted from the opening 21a with the first curtain 21b being contained in the container below the opening 21a and the second curtain 21c being contained in the container above the opening 21a). The motor 23 provides a driving force that causes the first curtain 21b and the second curtain 21c to be displaced into the container above the opening 21a, to the shutter controller 22. In the shutter unit 20, a plurality of (three in the present embodiment) holes 20a which allow screws 103 to be inserted thereinto are formed.

Now, the basic operation of the shutter unit 20 will be described. In a state (so called, a monitoring state) in which light is allowed to be incident on the imaging sensor through the interchangeable lens unit 100 to display an image on a liquid crystal monitor, the first curtain 21b is charged by the shutter controller 22 in a position where the first curtain 21b is contained in the container below the opening 21a and the second curtain 21c is charged by the shutter controller 22 in a position where the second curtain 21c is contained in the container above the opening 21a (retracted state).

Then, when a press operation is performed on the release button 2 (see FIG. 1, and the like), the first curtain 21b moves in the direction indicated by the arrow A by a driving force provided by the motor 23, whereby the opening 21a is shielded from light. Then, by the shutter controller 22, the charges of the first curtain 21b and the second curtain 21c are released in a stepwise manner. Specifically, first, the first curtain 21b moves in the direction indicated by the arrow B from the position where the first curtain 21b shields the opening 21a from light, and after a lapse of a predetermined period of time the second curtain 21c moves in the direction indicated by the arrow B from the container above the opening 21a. In this manner, the first curtain 21b is contained in the container below the opening 21a and the second curtain 21c shields the opening 21a from light. At this time, an image signal is generated based on light incident on an imaging sensor during a period of time after the first curtain 21b is retracted from the opening 21a and before the second curtain 21c shields the opening 21b from light. The image signal generated at this time is an image signal obtained based on a release operation by the user.

Thereafter, the second curtain 21c moves in the direction indicated by the arrow A by a driving force provided to the shutter controller 22 by the motor 23 and is then again contained in the container above the opening 21a and charged by the shutter controller 22. The first curtain 21b remains contained in the container below the opening 21a. Hence, the apparatus goes into a monitoring state in which light incident through the interchangeable lens unit 100 is incident on the imaging sensor in the imaging unit 30.

The heat sink 17 is arranged on the back surface side of the imaging unit 30. The heat sink 17 can absorb heat generated by the imaging unit 30 and release the heat.

The imaging unit 30 is arranged on the back surface side of the shutter unit 20. The imaging unit 30 can convert light incident thereon through the shutter unit 20 to an electrical signal and output the electrical signal. The imaging unit 30 includes a dust removal filter which can remove foreign matter such as dust attached to the imaging unit 30, by generating ultrasonic vibration. In the present embodiment, as an example of the dust removal filter, an SSWF (Supersonic Wave Filter) is provided. In the camera body 1 according to the present embodiment, in a state in which, as shown in FIGS. 1 and 2, the interchangeable lens unit 100 is not attached, the opening 4a of the lens mount 4 is open and thus there is a possibility that the foreign matter such as dust enters inside. Moreover, since the shutter unit 20 is of a normally open type, the imaging unit 30 can be viewed from the side of the lens mount 4. Thus, the possibility that the foreign matter attaches to the imaging unit 30 further increases. When the foreign matter attaches to the imaging unit 30, a problem arises such as the foreign matter appearing in an image. Hence, single-lens reflex type digital cameras and single-lens type digital cameras such as that in the present embodiment employ a configuration in which an SSWF is provided, and the foreign matter attached to the imaging sensor is shaken off by vibrating the SSWF.

Next, an assembling procedure of the imaging system configured in the above-described manner will be described. In FIGS. 5A and 5B, first, the contact pin unit 13 is fixed to the mount frame 14. Specifically, the screws 104 are inserted into the holes 13c and screwed into the screw holes 14g.

Then, the lens mount 4 is fixed to the front surface 14d of the mount frame 14 with the lens mount spring 12 therebetween. Specifically, the screws 101 are inserted into the holes 4b and screwed into the screw holes 14b. At this time, the lens lock pin 15 is disposed such that the protrusion 15a of the lens lock pin 15 is inserted into the hole 4d formed in the lens mount 4. The lock pin spring 16 is disposed between the back surface of the protrusion 15a of the lens lock pin 15 and the lens mount spring 12 such that the displacement direction of the lens lock pin 15 and the compression/extension direction of the lens mount spring 12 substantially match each other.

Then, the mount frame 14 is fixed to the main frame 11. Specifically, the projection 14e to which the lens mount 4, and the like, are fixed is inserted into the opening 11a of the main frame 11 and an abutment surface 14h of the mount frame 14 is caused to abut on a back surface 11c of the main frame 11. Then, the screws 102 are inserted into the holes 11b and screwed into the screw holes 14c.

Subsequently, as shown in FIG. 5A, the shutter unit 20 is fixed to a back surface of the mount frame 14. Specifically, the shutter unit 20 is caused to abut on the back surface of the mount frame 14 such that the opening 21a of the shutter unit 20 and the opening 14a of the mount frame 14 substantially match each other. Then, the screws 103 are inserted into the holes 20a (see FIG. 5C) formed in the shutter unit 20 and screwed into screw holes (not shown) formed in the back surface of the mount frame 14.

Then, the imaging unit 30 is fixed to a back surface of the shutter unit 20. Specifically, screws 108 are inserted into a plurality of (three in the present embodiment) holes 35c formed in the imaging unit 30 and screwed into a plurality of (three in the present embodiment) screw holes (not shown) formed in the mount frame 14. At this time, the imaging unit 30 is disposed in a position adjacent to the shutter controller 22 of the shutter unit 20.

Subsequently, the heat sink 17 is fixed to a back surface of the imaging unit 30 by a plurality of (four in the present embodiment) screws.

In the above-described manner, an imaging system 60 is completed. Note that the above-described assembling procedure is an example and thus the order may be appropriately changed. For example, although the present embodiment shows the assembling procedure in which the part group P1 is assembled first and then the part group P2 is fixed to the mount frame 14, an assembling procedure may be such that the part group P2 is fixed to the mount frame 14 first and then the part group P1 is fixed thereto.

3. Configuration of the Contact Pin Unit 13

Figure 6:
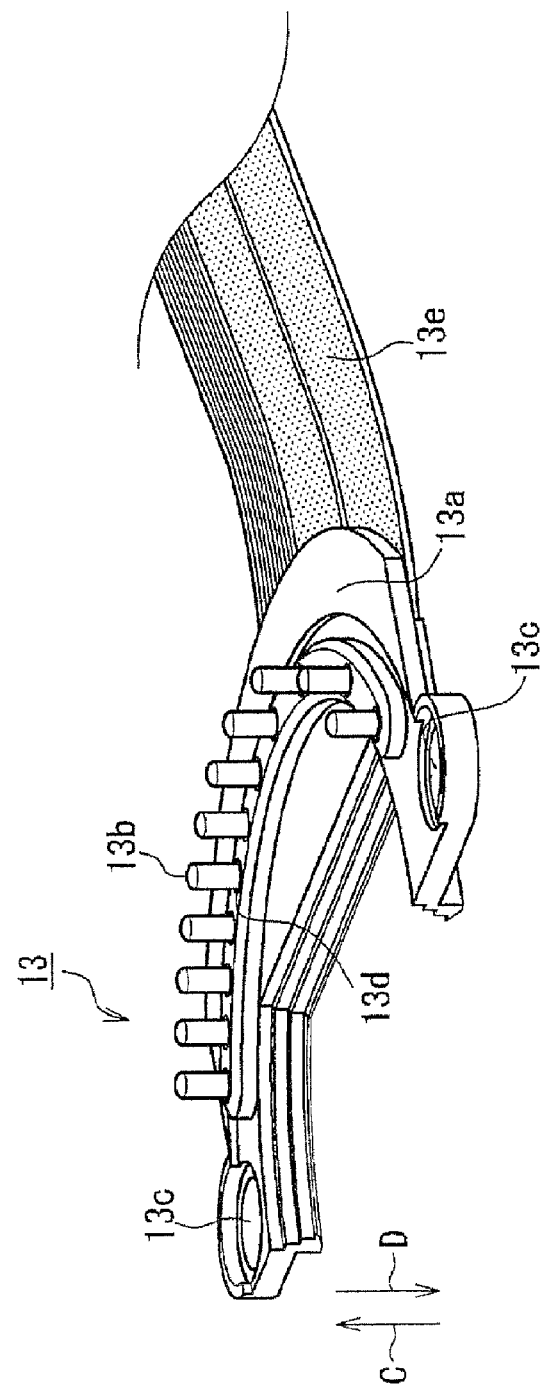
FIG. 6 is a perspective view of a contact pin unit.
Figure 7:
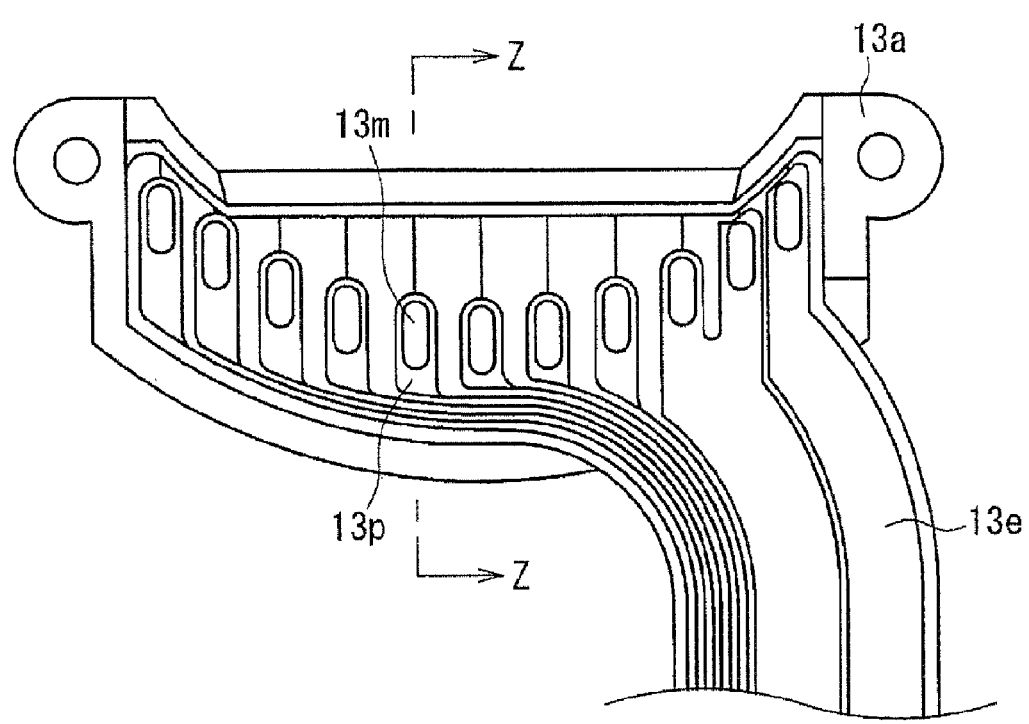
FIG. 7 is a plan view showing a configuration of the back side of the contact pin unit.
Figure 8A:
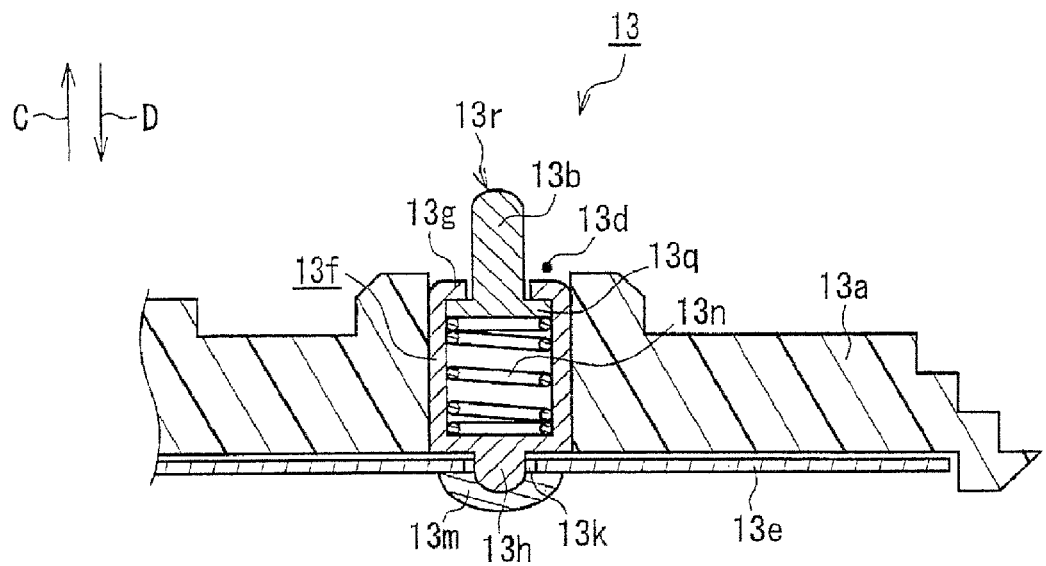
FIG. 8A is a cross-sectional view taken along portion Z-Z of FIG. 7.
Figure 8B:
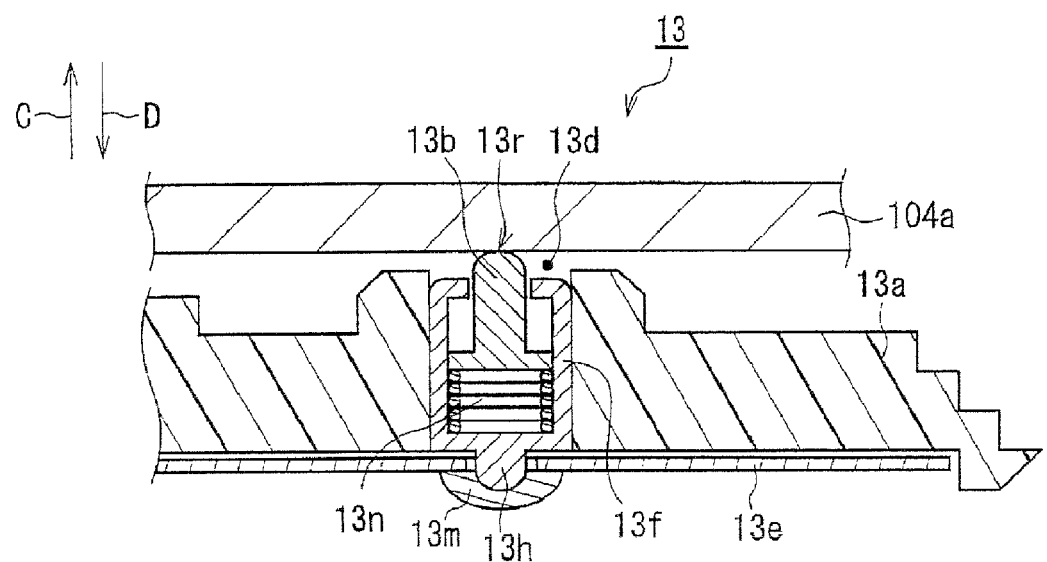
FIG. 8B is a cross-sectional view taken along portion Z-Z of FIG. 7.

FIG. 6 is a perspective view of the main part of the contact pin unit 13. FIG. 7 is a plan view showing a configuration of the side of a back surface of the contact pin unit 13 (a surface of the back side when a surface on the side where the contact pins 13b are arranged is a front surface). FIGS. 8A and 8B are cross-sectional views of the main part taken along portion Z-Z of FIG. 7. FIG. 8A shows a state in which the interchangeable lens unit 100 is not attached to the camera body 1 and FIG. 8B shows a state in which the interchangeable lens unit 100 is attached to the camera body 1.

As shown in FIG. 6, the contact pin unit 13 has a plurality of (11 in the present embodiment) holes 13d formed along an arc-shaped portion of a substantially semicircular frame 13a. Contact pins 13b are arranged in the holes 13d so as to be displaceable in directions indicated by arrows C and D. The contact pins 13b are formed in a substantially cylindrical shape and formed of a conductive material such as a metal. As shown in FIG. 7, an FPC (Flexible Printed Circuit) 13e is arranged on the back surface side of the frame 13a. The FPC 13e extends from the frame 13a and is electrically connected to an electrical circuit board (not shown) arranged in the camera body 1. The FPC 13e has a plurality of wiring patterns 13p. In addition, the FPC 13e has holes 13k (see FIG. 8A) formed at locations that come into contact with the wiring patterns 13p.

As shown in FIGS. 8A and 8B, a holding member 13f is press-fitted in each hole 13d formed in the frame 13a. The holding member 13f is formed in a substantially cylindrical shape and formed of a material having conductivity such as a metal. In the inner space of the holding member 13f, a contact pin 13b and a spring 13n are arranged. One end of the holding member 13f is integrally formed with a rib 13g. The other end of the holding member 13f is integrally formed with a protrusion 13h. The protrusion 13h has an outside diameter at which the protrusion 13h can be inserted into at least the hole 13k formed in the FPC 13e. The protrusion 13h is joined to a wiring pattern 13p (see FIG. 7) by a solder 13m with the protrusion 13h being inserted into the hole 13k formed in the FPC 13e.

One end (on the side of a tip 13r) of the contact pin 13b projects from the holding member 13f in either of a projected state shown in FIG. 8A and a contained state shown in FIG. 8B. The other end side of the contact pin 13b is integrally formed with a flange 13q. The flange 13q abuts on the rib 13g integrally formed with the holding member 13f when the contact pin 13b is at a projected position, as shown in FIG. 8A, to prevent the contact pin 13b from being detached from the holding member 13f in the direction indicated by the arrow C.

The spring 13n is configured by a coil spring. The spring 13n can compress and extend in the direction indicated by the arrow C or D. One end of the spring 13n is mechanically and electrically coupled to the contact pin 13b and the other end of the spring 13n is mechanically and electrically coupled to an inner surface on the other end side of the holding member 13f. The spring 13n can be formed of an insulating material such as a resin, but in the present embodiment the spring 13n is formed of a material having conductivity. By forming the spring 13n with a conductive material, as in the present embodiment, an electrical connection between the contact pin 13b and the holding member 13f can be reliably established. Note that although in the present embodiment the spring 13n is a coil spring, the spring 13n may be formed of an elastic material such as a blade spring or rubber, provided that the spring 13n can urge at least the contact pin 13b in the direction indicated by the arrow C. In such a case, also, forming the blade spring with a conductive material such as a metal or combining a conductive material in the elastic material provides an effect of being able to reliably establish an electrical connection between the contact pin 13b and the holding member 13f.

The operation of the contact pins 13b will be described below.

In a state in which, as shown in FIG. 1, the interchangeable lens unit 100 is not attached to the lens mount 4 of the camera body 1, each contact pin 13b is in the state shown in FIG. 8A. Specifically, the contact pin 13b is biased in the direction indicated by the arrow C by the spring 13n and thus the tip 13r and a portion therearound project from the holding member 13f. At this time, the flange 13q formed on the contact pin 13b abuts on the rib 13g formed on the holding member 13f to prevent the contact pin 13b from being detached from the holding member 13f.

Then, when, as shown in FIG. 4, the interchangeable lens unit 100 is attached to the lens mount 4 of the camera body 1, a contact 104a arranged on the interchangeable lens unit 100 abuts on the contact pin 13b and presses the contact pin 13b in the direction indicated by the arrow D as shown in FIG. 8B. By the contact pin 13b being pressed in the direction indicated by the arrow D, the spring 13n is compressed and displaced in the direction indicated by the arrow D. In this manner, the contact 104a and the contact pin 13b are electrically connected to each other. Since the contact pin 13b, the spring 13n, and the holding member 13f are formed of a conductive material, the contact 104a is brought into conduction with the wiring pattern 13p on the FPC 13e through the contact pin 13b, the spring 13n, the holding member 13f, and the solder 13m.

Note that since the holding member 13f is press-fitted in the hole 13d formed in the frame 13a, even when the contact pin 13b is displaced in the direction indicated by the arrow D, the holding member 13f is not displaced in the direction indicated by the arrow D.

Since the contact pin 13b is biased in the direction indicated by the arrow C by the spring 13n, the tip 13r reliably abuts on the contact 104a and thus an electrical connection between the contact pin 13b and the contact 104a can be reliably established. That is, by biasing the contact pin 13b by the spring 13n, even when, for example, vibration or shock is applied to the imaging apparatus, the contact pin 13b is less likely to be displaced in the direction indicated by the arrow D and thus the contact pin 13b and the contact 104a are not likely to be separated from each other. Accordingly, even when vibration or shock is applied to the digital camera while communication is performed between the lens microcomputer and the camera microcomputer through the contact pins 13b and the contacts 104a, the possibility that the communication is disconnected can be reduced.

When the interchangeable lens unit 100 is detached from the camera body 1, the contact pin 13b is pressed in the direction indicated by the arrow C by a biasing force of the spring 13n and, as shown in FIG. 8A, the contact pin 13b is displaced to a position where the tip 13r projects from the holding member 13f.

4. Effects of the Embodiment, and the Like

According to the present embodiment, a configuration is employed in which a contact pin 13b is held by a holding member 13f, a spring 13n is disposed, and the holding member 13f is fixed to the frame 13a. According to the configuration, even when the contact pin 13b is pressed by a contact 104a when the interchangeable lens unit 100 is attached to the lens mount 4, the holding member 13f is not displaced. Therefore, since a portion (protrusion 13h) where the FPC 13e is soldered and connected is not displaced either, a solder 13m can be prevented from coming off, enabling to prevent an electrical connection between the holding member 13f and the FPC 13e from being disconnected.

Instead of a configuration (one described in JP-A-62-27338) in which a lead wire is connected to an electric contact, a configuration is employed in which the holding member 13f is connected to the FPC 13e. With this configuration, flexibility in the layout of the contact pins 13b can be improved. Furthermore, the contact pins 13b can be disposed with narrow pitches. Specifically, in the conventional configuration (JP-A-62-27338), since a lead wire is connected to an electric contact, there is limited flexibility in the layout of electric contacts in order to enable the routing of lead wires, and the like. However, in the present embodiment, since the contact pin 13b is fixed and connected to the FPC 13e through the holding member 13f, a problem associated with the routing of lead wires, and the like, does not arise. Accordingly, flexibility in the layout of the contact pins 13b can be improved. In addition, the contact pins 13b can be disposed with narrow pitches, further enabling miniaturization of the apparatus.

In the present embodiment, since a member that abuts on the movable contact pin 13b is the holding member 13f that holds the contact pin 13b, the contact pin 13b comes into surface-contact with the holding member 13f. Thus, the contact area increases more over the case where an electric contact comes into point contact with a member that abuts on the electric contact and feeds electricity thereto, and accordingly, the electrical resistance can be reduced.

The contact pin unit 13 can be miniaturized and thus the camera body 1 and the interchangeable lens unit 100 can be miniaturized. In addition, since the number of the contact pins 13b can be increased without increasing the size of the contact pin unit 13, a digital camera can be further made multifunctional and the speed of communication between the camera body 1 and the interchangeable lens unit 100 can be further increased.

Moreover, when the interchangeable lens unit 100 is attached to the lens mount 4, the contact pin 13b is pressed against the side of the contact 104a by the spring 13n, and thereby an electrical connection between the contact pin 13b and the contact 104a can be reliably established. Particularly, even when vibration, shock, or the like, is applied to the camera body 1 having the interchangeable lens unit 100 attached thereto, the contact pin 13b is less likely to be displaced and thus the electrical connection between the contact pin 13b and the contact 104a can be maintained.

By allowing the spring 13n to be coupled to an inner surface (bottom surface) on the other end side of the holding member 13f and to abut on an inner wall of the holding member 13f which is substantially orthogonal to the inner surface, the contact area between the holding member 13f and the spring 13n can be increased. Accordingly, the electrical connection between the contact pin 13b and the holding member 13f can be made more reliable.

Note that although in the present embodiment the contact pin unit 13 is included in the camera body 1, the contact pin unit 13 may be included in the interchangeable lens unit 100. In that case, terminals (corresponding to the contacts 104a in the present embodiment) that can be electrically connected to contact pins (corresponding to the contact pins 13b in the present embodiment) need to be provided near the lens mount 4 of the camera body 1. Alternatively, the contact pin unit 13 according to the present embodiment may be provided to both the camera body 1 and the interchangeable lens unit 100.

Although in the present embodiment the contact pins 13b are arranged in a single row along the substantially arc-shaped portion of the frame 13a, the contact pins 13b may be arranged in a plurality of rows. Particularly, as in the present embodiment, by employing a configuration using the FPC 13e, the contact pins 13b can be disposed with narrow pitches. In this manner, the contact pins 13b can be arranged in a plurality of rows without making the contact pin unit 13 extremely large in size.

Although in the present embodiment the holding member 13f is press-fitted in the hole 13d of the frame 13a, the holding member 13f may be fixed by other methods as long as at least the holding member 13f is not displaced when the contact pin 13b is displaced. For example, there may be considered a configuration in which the holding member 13f is fixed to the frame 13a with an adhesive, or a configuration in which a external thread is formed on an outer wall of the holding member 13f, a internal thread is formed on an inner wall of the hole 13d, and the holding member 13f is fixed in the hole 13d by screwing.

Although in the present embodiment the holding member 13f is connected to the FPC 13e, not only an FPC but also a resin printed circuit board may be used as long as at least wiring patterns with narrow pitches are formed thereon.

Although in the present embodiment the contact pin 13b is electrically connected to the FPC 13e through the spring 13n and the holding member 13f, the contact pin 13b may be connected to the FPC 13e only through the spring 13n. Specifically, the other end of the spring 13n may be directly connected to a wiring pattern on the FPC 13e by soldering, and the like.

Figure 9A:
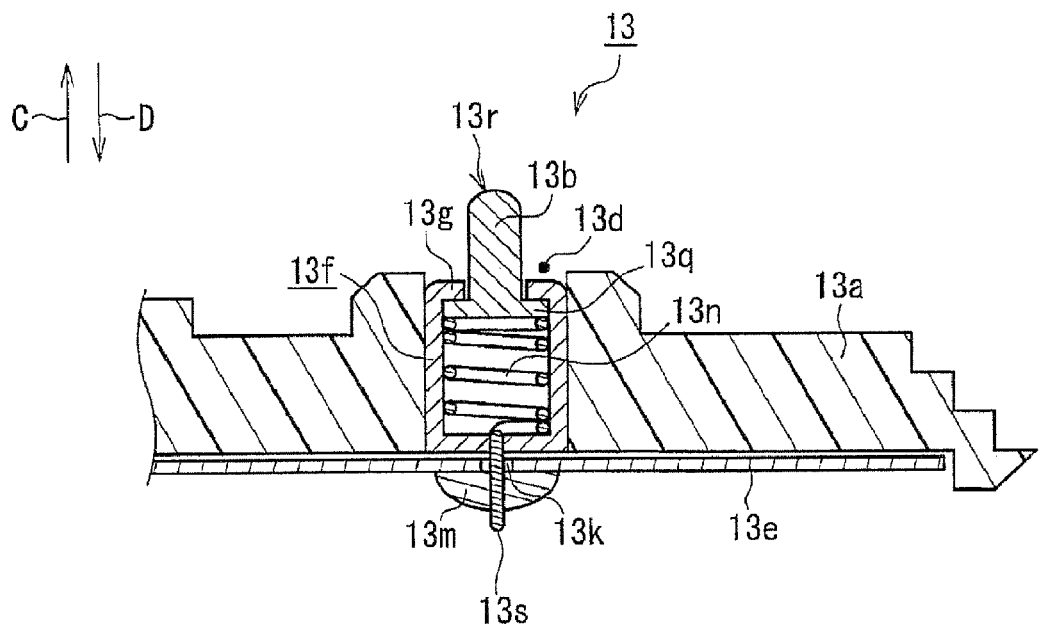
FIG. 9A is a cross-sectional view showing another exemplary configuration of the contact pin unit.
Figure 9B:
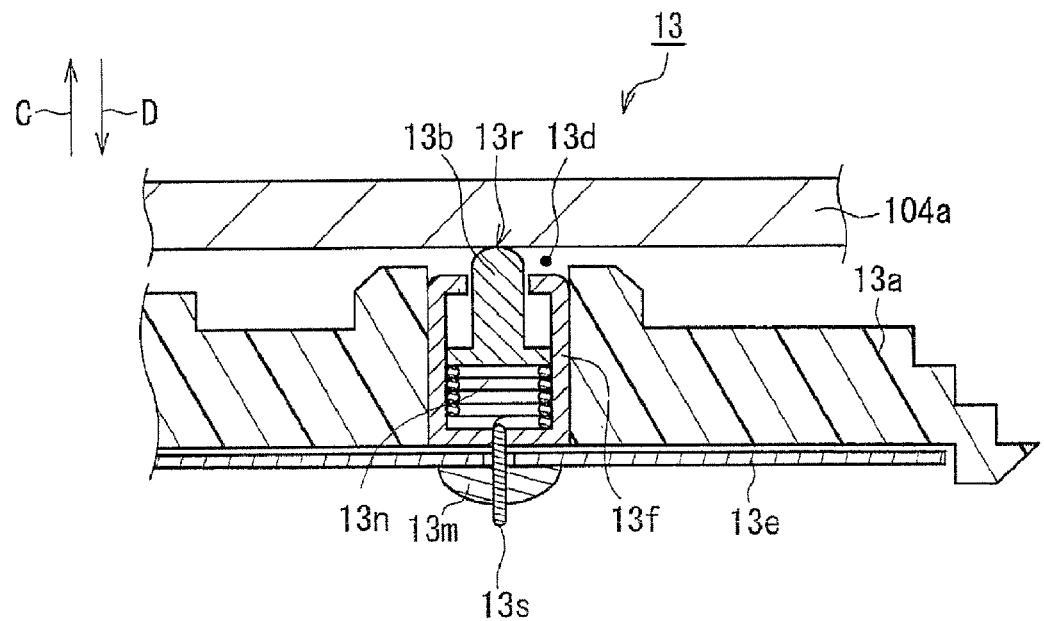
FIG. 9B is a cross-sectional view showing another exemplary configuration of the contact pin unit.

FIGS. 9A and 9B show another exemplary configuration of the contact pin unit. FIG. 9A shows a state in which the interchangeable lens unit 100 is not attached to the lens mount 4 and thus a contact pin 13b is biased in a direction indicated by an arrow C by a spring 13n. FIG. 9B shows a state in which the interchangeable lens unit 100 is attached to the lens mount 4 and thus the contact pin 13b is pressed in a direction indicated by an arrow D by a contact 104a. As shown in FIGS. 9A and 9B, a configuration may be employed in which an other end 13s of the spring 13n is allowed to penetrate through an inner surface of a holding member 13f to the outside and the end 13s is electrically connected to a wiring pattern 13p on the FPC 13e by soldering. Even in such a configuration, the same effects as those obtained in the embodiment can be obtained. In addition, according to this configuration, since a protrusion 13h does not need to be formed, the material cost required to form the holding member 13f can be reduced over the configuration shown in FIGS. 8A and 8B.

The frame 13a according to the present embodiment is an example of a substrate. The holding member 13f according to the present embodiment is an example of a holding member. The contact pin 13b according to the present embodiment is an example of a body-side contact. The spring 13n according to the present embodiment is an example of a biasing unit. The lens mount 4 according to the present embodiment is an example of a lens attaching unit. The contact 104a according to the present embodiment is an example of a lens-side contact.

5. Conventional Contact Pin Unit

Figure 10:
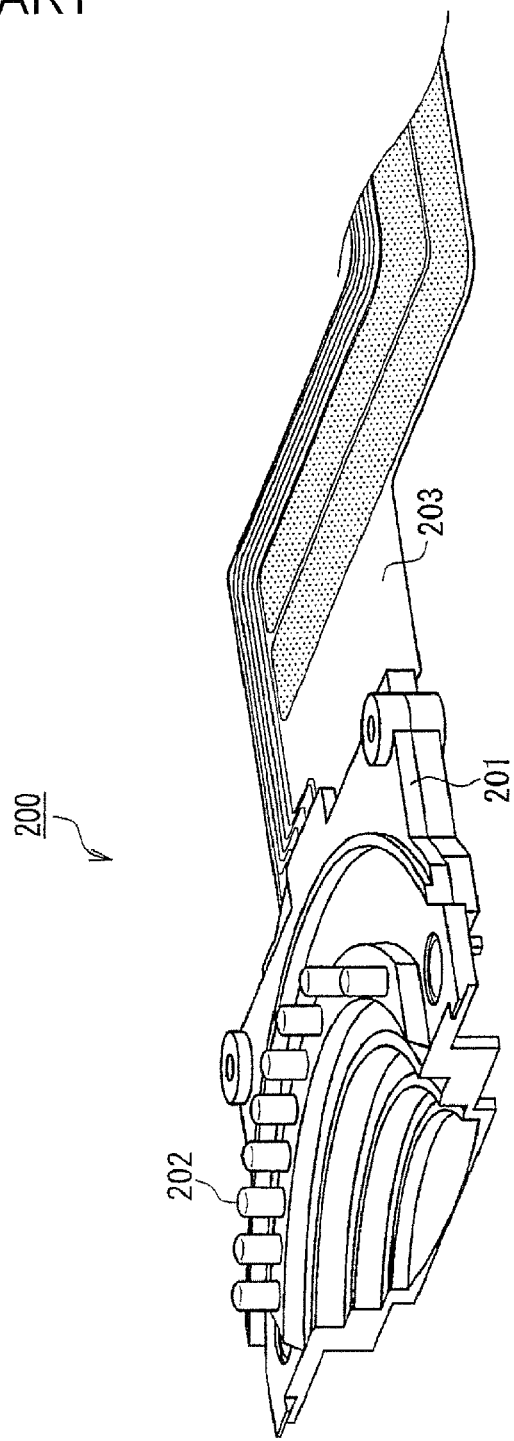
FIG. 10 is a perspective view of a conventional contact pin unit.
Figure 11:
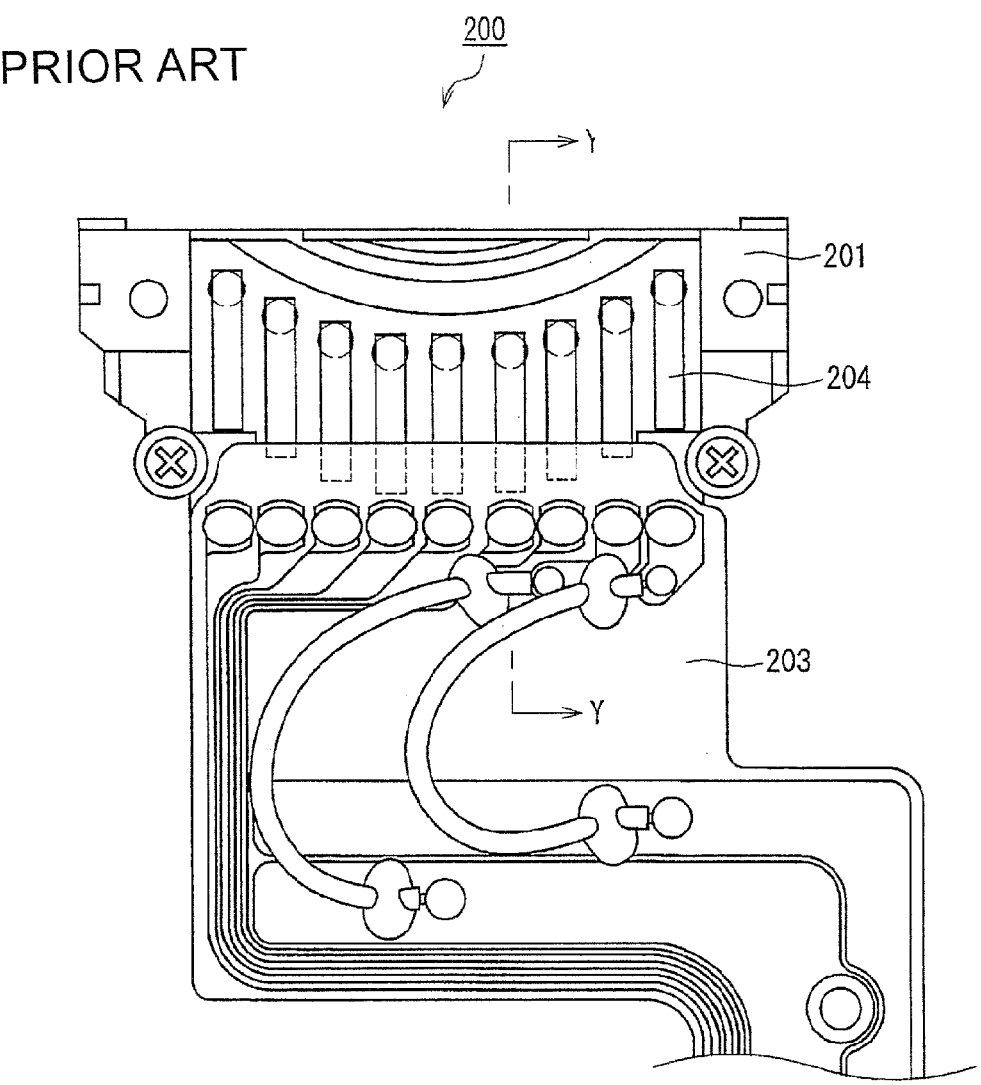
FIG. 11 is a plan view showing a configuration of the back side of the conventional contact pin unit.
Figure 12A:
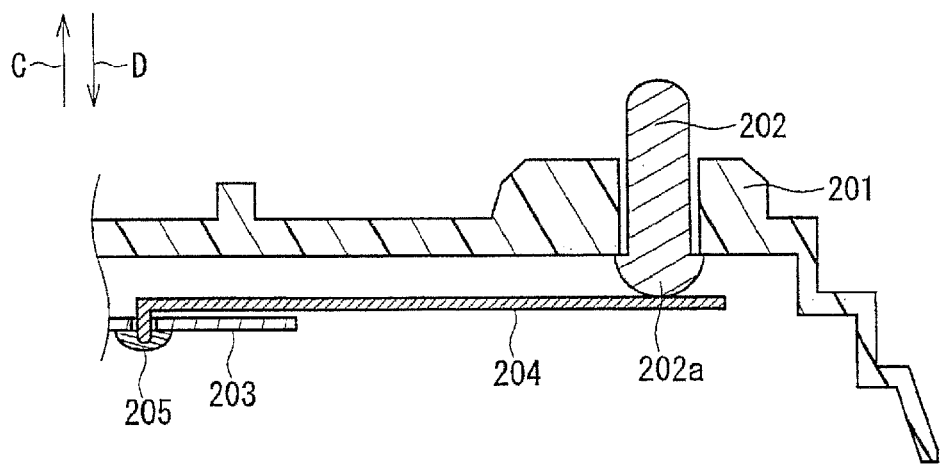
FIG. 12A is a cross-sectional view taken along portion Y-Y of FIG. 11.
Figure 12B:
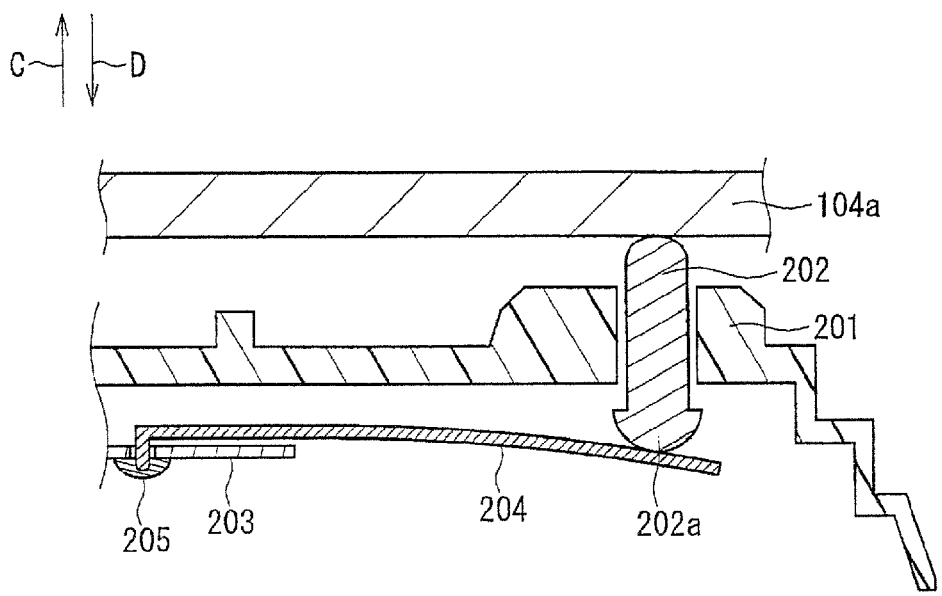
FIG. 12B is a cross-sectional view taken along portion Y-Y of FIG. 11.

Conventionally, there is a contact pin unit such as that shown in FIGS. 10 to 12B. FIG. 10 is a perspective view of a conventional contact pin unit. FIG. 11 is a plan view of the back surface side of the contact pin unit. FIG. 12A is a cross-sectional view taken along portion Y-Y of FIG. 11 and shows a state in which an interchangeable lens unit is not attached to a camera body. FIG. 12B shows a state in which the interchangeable lens unit is attached to the camera body. This contact pin unit 200 includes a plurality of contact pins 202 on a frame 201. The contact pin unit 200 also includes an FPC 203 which is electrically connected to the contact pins 202. As shown in FIGS. 11 and 12A, the contact pins 202 and the FPC 203 are electrically connected to each other by blade springs 204 formed of a conductive material. Each contact pin 202 is held in a projected position shown in FIG. 12A, by a biasing force in a direction indicated by an arrow C exerted by a corresponding blade spring 204. The blade spring 204 is electrically connected, at an end thereof, to the FPC 203 by a solder 205.

In a state in which, as shown in FIG. 12A, the contact pin 202 is in the projected position, when the interchangeable lens unit is attached to the camera body, the contact pin 202 is pressed in a direction indicated by an arrow D by a contact 104a arranged on the interchangeable lens unit. With this configuration, as shown in FIG. 12B, the contact pin 202 is displaced in the direction indicated by the arrow D while elastically deforming the blade spring 204. In the state shown in FIG. 12B, the blade spring 204 abuts on an end 202a of the contact pin 202 by a biasing force in the direction indicated by the arrow C which is generated by the elastic deformation and electrically connects the contact 104a, the contact pin 202, and the FPC 203.

6. Comparison Between the Contact Pin Unit According to the Present Embodiment and the Conventional Contact Pin Unit In the configuration of the contact pin unit shown in FIG. 10 and the like, in a state where, as shown in FIG. 12B, the blade spring 204 is elastically deformed, a load is applied to a portion connected to the FPC 203 by the solder 205 and accordingly a wire may break. On the other hand, in the contact pin unit 13 according to the present embodiment, since a soldered portion is not displaced, a load is not applied to the soldered portion upon attachment of the interchangeable lens unit and thus a wire can be prevented from breaking. In addition, since the contact pin unit 13 according to the present embodiment does not use blade springs, the contact pins 13b can be disposed in a staggered fashion, enabling to increase the number of contacts without increasing the size of the contact pin unit 13.

Since the holding member 13f is formed of a conductive member and the holding member 13f and the contact pin 13b come into contact with each other, the contact area therebetween increases and thus the contact resistance decreases.

In the conventional contact pin unit, in a state in which the contact 104a and the contact pin 202 or the contact pin 202 and the blade spring 204 are in point contact with each other, the contact resistance tends to increase; as a result, electrical resistance of signal circuit also tends to increase. However, in the present embodiment, since the holding member 13f is formed of a conductive material and the holding member 13f and the contact pin 13b come into surface-contact with each other, the contact area increases and thus the contact resistance decreases. Moreover, since the holding member 13f and the contact pin 13b come into contact with each other also through the spring 13n, the contact resistance further decreases.

Particularly, as can be seen from FIGS. 12A and 12B, in the configuration of the contact pin unit 200 shown in FIG. 10 and the like, in the state where, as shown in FIG. 12B, the blade spring 204 is elastically deformed, a load is applied to a portion connected to the FPC 203 by the solder 205. Hence, even if a wire does not break, the contact state between the blade spring 204 and the FPC 203 at this connected portion deteriorates and accordingly the electrical resistance may increase. However, in the present embodiment, since such a load is not applied between the contact pin unit 13 and the FPC 13e, an increase in electrical resistance between the contact pin unit 13 and the FPC 13e does not occur.

As shown in FIG. 11, the blade springs 204 have an elongated shape to ensure the function as springs, but as a result, there is a problem that the size of the camera body 1 increases by an amount comparable to the length of the blade springs 204. However, in the present embodiment, since blade springs such as those described above are not required, a dimension of the camera body 1 in the direction of the length of the blade springs 204 can be reduced.

Since the conventional contact pin unit uses the blade springs 204, certain spacing needs to be provided between the blade springs 204, which makes it difficult to narrow the spacing between the contact pins 13b in a direction in which the blade springs 204 are arranged. However, in the present embodiment, since the holding members 13f of the contact pin unit 13 are directly fixed to the FPC 13e, as described above, without using the blade springs 204, the spacing between the contact pins 13b can be narrowed.

Particularly, in recent years, with an increase in the amount of signal communicated between the camera body 1 and the lens unit 100, there has been a demand for an increase in the number of the contact pins 13b. In such a case, according to the contact pin unit 13 according to the present embodiment, the above-described demand can be responded to while avoiding an increase in the sizes of the camera body 1, the lens unit 100, and the like.

In the conventional contact pin unit, when in FIG. 12A the contact pin 202 moves downward, the blade spring 204 is elastically deformed downward and thus projects downward. That is, since the blade spring 204 projects downward, space or the like corresponding to the amount of the projection needs to be provided underneath the contact pin 202, increasing a dimension in a direction of the movement. However, in the contact pin unit 13 according to the present embodiment, the length of the contact pin 13b can be reduced. Accordingly, the dimensions of the camera body 1 can be reduced by an amount comparable to the reduction in the length of the contact pin 13b.

INDUSTRIAL APPLICABILITY

The present embodiment is useful for lens interchangeable type cameras. Examples of applications of the present invention include single-lens reflex type digital cameras, single-lens type digital cameras, and single-lens reflex type silver-halide cameras.

What is claimed is:

1. A camera body that includes a lens attaching unit to which an interchangeable lens unit including a lens-side contact is mountable and that communicates information with the interchangeable lens unit when the interchangeable lens unit is attached to the lens attaching unit, the camera body comprising:

a substrate;

a holding member fixed to the substrate and formed of a conductive material;

a body-side contact that is electrically connected to the lens-side contact when the interchangeable lens unit is mounted to the camera body and that is held by the holding member so as to be movable between a projected position at which the body-side contact projects from the holding member and a retracted position; and a biasing unit that biases the body-side contact to the projected position, wherein the body-side contact is electrically connected to the holding member.

2. The camera body according to claim 1, wherein
the biasing unit is formed of a conductive material and is held in the holding member, and
the body-side contact is electrically connected to the holding member through the biasing unit.

3. The camera body according to claim 2, wherein one end of the biasing unit projects penetrating through the holding member.

4. An imaging apparatus comprising:
a camera body according to claim 1; and
an interchangeable lens unit that includes a body attaching unit mountable to the camera body and that communicates information with the camera body when the camera body is attached to the body attaching unit, the interchangeable lens unit comprising:
a substrate;
a holding member fixed to the substrate and formed of a conductive material;
a lens-side contact that is electrically connected to the body-side contact when the interchangeable lens unit is mounted to the camera body and that is held by the holding member so as to be movable between a projected position at which the lens-side contact projects from the holding member and a retracted position; and
a biasing unit that biases the lens-side contact to the projected position, wherein the lens-side contact is electrically connected to the holding member.

5. An imaging apparatus comprising:
a camera body according to claim 1; and
an interchangeable lens unit including a substantially flat lens-side contact that is electrically connectable to a body-side contact of the camera body.

6. An interchangeable lens unit that includes a body attaching unit mountable to a camera body including a body-side contact and that communicates information with the camera body when the camera body is attached to the body attaching unit, the interchangeable lens unit comprising:
a substrate;
a holding member fixed to the substrate and formed of a conductive material;
a lens-side contact that is electrically connected to the body-side contact when the interchangeable lens unit is mounted to the camera body and that is held by the holding member so as to be movable between a projected position at which the lens-side contact projects from the holding member and a retracted position; and
a biasing unit that biases the lens-side contact to the projected position, wherein the lens-side contact is electrically connected to the holding member.

7. The interchangeable lens unit according to claim 6, wherein
the biasing unit is formed of a conductive material and is held in the holding member, and
the lens-side contact is electrically connected to the holding member through the biasing unit.

8. The interchangeable lens unit according to claim 6, wherein one end of the biasing unit projects penetrating through the holding member.

9. An imaging apparatus comprising:
an interchangeable lens unit according to claim 6; and
a camera body including a substantially flat body-side contact that is electrically connectable to a lens-side contact of the interchangeable lens unit.

* * * * *